United States Patent
Hasegawa et al.

(10) Patent No.: US 12,494,903 B2
(45) Date of Patent: Dec. 9, 2025

(54) INFORMATION PROCESSING DEVICE AND INFORMATION PROCESSING SYSTEM

(71) Applicant: NTT DOCOMO, INC., Tokyo (JP)

(72) Inventors: Keita Hasegawa, Chiyoda-ku (JP); Kazuma Nozawa, Chiyoda-ku (JP); Takuya Doumen, Chiyoda-ku (JP); Tomohiro Nakagawa, Chiyoda-ku (JP); Hiroshi Aono, Chiyoda-ku (JP); Masayuki Terada, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 8 days.

(21) Appl. No.: 18/729,287

(22) PCT Filed: Nov. 29, 2022

(86) PCT No.: PCT/JP2022/043941
§ 371 (c)(1),
(2) Date: Jul. 16, 2024

(87) PCT Pub. No.: WO2023/145240
PCT Pub. Date: Aug. 3, 2023

(65) Prior Publication Data
US 2025/0132902 A1    Apr. 24, 2025

(30) Foreign Application Priority Data
Jan. 27, 2022  (JP) ................. 2022-010750

(51) Int. Cl.
*H04L 9/08*        (2006.01)
(52) U.S. Cl.
CPC ............ *H04L 9/083* (2013.01); *H04L 9/0825* (2013.01)
(58) Field of Classification Search
CPC ...................................... H04L 9/083
See application file for complete search history.

(56) References Cited

U.S. PATENT DOCUMENTS 3,573,741 A * 4/1971 Gavril ................. G06F 13/124
                                                710/5
8,422,486 B2 * 4/2013 Tang .................. H04L 61/2575
                                                370/352
(Continued)

FOREIGN PATENT DOCUMENTS

JP       2011-81301 A    4/2011
JP       2020-202505 A   12/2020
(Continued)

OTHER PUBLICATIONS

English translation of the International Preliminary Report on Patentability and Written Opinion issued Aug. 8, 2024 in PCT/JP2022/043941, 6 pages.

(Continued)

*Primary Examiner* — Bradley W Holder
(74) *Attorney, Agent, or Firm* — Oblon, McClelland, Maier & Neustadt, L.L.P.

(57) ABSTRACT

In response to a request from a first device (100), a management unit (300) transmits a data encryption key to the first device (100) through a secure environment between the management unit (300) and the first device (100) when integrity of a first application running in an isolated calculation area is verified. The first device (100) encrypts target data using the data encryption key and transmits encrypted target data to a second device (200) through the first application. In response to a request from the second device (200), the management unit (300) transmits a data encryption key to the second device (200) through a secure environment between the management unit (300) and the second device (200) when integrity of a second application running in an isolated calculation area is verified. The second device (200) decrypts the encrypted target data using the data encryption key through the second application.

2 Claims, 7 Drawing Sheets

(56) References Cited

U.S. PATENT DOCUMENTS

| | | | |
|---|---|---|---|
| 2011/0302415 A1 | 12/2011 | Ahmad et al. | |
| 2015/0089244 A1 | 3/2015 | Roth et al. | |
| 2016/0217290 A1 | 7/2016 | Roth et al. | |
| 2017/0201988 A1* | 7/2017 | Seo .................. | H04W 72/04 |
| 2019/0034644 A1 | 1/2019 | Roth et al. | |
| 2019/0116627 A1* | 4/2019 | Min .................. | H04W 64/00 |
| 2021/0173948 A1 | 6/2021 | Roth et al. | |
| 2024/0126895 A1 | 4/2024 | Roth et al. | |

FOREIGN PATENT DOCUMENTS

| | | |
|---|---|---|
| JP | 6795863 B1 | 12/2020 |
| JP | 2021-22945 A | 2/2021 |

OTHER PUBLICATIONS

International Search Report issued Jan. 31, 2023 in PCT/JP2022/043941 filed on Nov. 29, 2022, 3 pages.

Okamoto, "Introduction to Encryption Theory. First ed", Kyoritsu Shuppan Co., Ltd, Feb. 25, 1993, 7 pages (with Partial English translation).

Akashi et al., "Multimedia Information Market System (InfoKet)", NTT R & D, 1997, vol. 46, No. 2, 9 pages (with Partial English translation).

Extended European Search Report issued Feb. 21, 2025 in European Patent Application No. 22924092.4, 12 pgs.

Japanese Office Action issued Aug. 5, 2025 in Japanese Patent Application No. 2023-576661 (with English translation), 11 pages.

\* cited by examiner

INFORMATION PROCESSING DEVICE AND INFORMATION PROCESSING SYSTEM

TECHNICAL FIELD

The present disclosure relates to an information processing device in which isolated calculation areas are formed and an information processing system including a plurality of information processing devices in which isolated calculation areas are formed.

BACKGROUND ART

Secure computing is a general term for technologies that enable various processes to be performed on encrypted data. In particular, technologies that enable the integration of data between two parties without disclosing the data to each other (see Patent Literature 1, for example) and matching (secure matching) of data between two parties are known. In order to respond to threat models against such secure computing, security is required when a participant in the secure computing, not an external third party, becomes malicious. As attacker models that pose a threat to secure computing, there are largely two patterns: "semi-honest model" and "malicious model". Among these, the "semi-honest model" is an attacker who attempts to obtain information of other participants from legitimate input and output without tampering with data, and the "malicious model" is an attacker who attempts to obtain information of other participants by arbitrarily tampering with data.

CITATION LIST

Patent Literature

Patent Literature 1: Japanese Unexamined Patent Publication No. 2011-081301

SUMMARY OF INVENTION

Technical Problem

In order to respond to attacks from the above-described malicious model, it is necessary to guarantee that the processing results obtained, no matter what kind of tampering occurs, are the same as those obtained by legitimate participants who behave honestly. Therefore, it is necessary to verify that the data from the participants in the secure computing is correct (not tampered with) one by one. For this reason, in order to make a system designed to be able to respond to attacks from the semi-honest model respond to attacks from the malicious model, there is a problem that the amount of computation increases as a result of performing the above-described data verification processing one by one, leading to performance degradation such as a decrease in processing speed.

The present disclosure has been made to solve the above-described problem, and it is an object of the present disclosure to enable a system designed to be able to respond to attacks from semi-honest models to respond to attacks from malicious models without causing performance degradation.

Solution to Problem

An information processing system according to the present disclosure is an information processing system including: a first information processing device in which a first isolated calculation area is formed as an isolated calculation area; and a second information processing device in which a second isolated calculation area is formed as an isolated calculation area. A management unit that generates and manages a data encryption key for encrypting data transmitted and received between the first information processing device and the second information processing device is provided inside the first information processing device or the second information processing device or outside the first information processing device and the second information processing device. The first information processing device includes a first processing unit that transmits a data encryption key use request including first authentication information, which is used by the management unit to verify integrity of a first application running in the first isolated calculation area, to the management unit through the first application. The management unit includes a first management unit that verifies the integrity of the first application using the first authentication information and first verification information stored in advance and transmits the data encryption key to the first information processing device through a secure environment between the management unit and the first information processing device only when the integrity is verified. The first information processing device further includes a first encryption unit that encrypts target data to be processed using the received data encryption key and transmits encrypted target data to the second information processing device through the first application. The second information processing device includes a second processing unit that transmits a data encryption key use request including second authentication information, which is used by the management unit to verify integrity of a second application running in the second isolated calculation area, to the management unit through the second application. The management unit further includes a second management unit that verifies the integrity of the second application using the second authentication information and second verification information stored in advance and transmits the data encryption key to the second information processing device through a secure environment between the management unit and the second information processing device only when the integrity is verified. The second information processing device further includes a second encryption unit that decrypts the encrypted target data received from the first information processing device, using the received data encryption key, through the second application.

In the information processing system described above, when the first processing unit of the first information processing device transmits the data encryption key use request including the first authentication information, which is used by the management unit to verify the integrity of the first application running in the first isolated calculation area, to the management unit through the first application, the first management unit in the management unit verifies the integrity of the first application using the first authentication information and the first verification information stored in advance, and transmits the data encryption key to the first information processing device through the secure environment between the management unit and the first information processing device only when the integrity is verified. As described above, only when the integrity of the first application running in the first isolated calculation area is verified, the data encryption key is transmitted to the first information processing device through the secure environment between the management unit and the first information processing device. In addition, the "integrity of the first application running in the first isolated calculation area" is a concept including the integrity of the first application itself and the integrity of the first isolated calculation area that is the running environment of the first application.

Then, the first encryption unit of the first information processing device encrypts the target data to be processed using the data encryption key received through the secure environment and transmits the encrypted target data to the second information processing device through the first application.

Then, when the second processing unit of the second information processing device transmits the data encryption key use request including the second authentication information, which is used by the management unit to verify the integrity of the second application running in the second isolated calculation area, to the management unit through the second application, the second management unit in the management unit verifies the integrity of the second application using the second authentication information and the second verification information stored in advance, and transmits the data encryption key to the second information processing device through the secure environment between the management unit and the second information processing device only when the integrity is verified. As described above, only when the integrity of the second application running in the second isolated calculation area is verified, the data encryption key is transmitted to the second information processing device through the secure environment between the management unit and the second information processing device. In addition, the "integrity of the second application running in the second isolated calculation area" is a concept including the integrity of the second application itself and the integrity of the second isolated calculation area that is the running environment of the second application.

In addition, the second encryption unit of the second information processing device decrypts the encrypted target data received from the first information processing device, using the data encryption key received through the secure environment, through the second application. In this manner, in the second information processing device, through the second application which runs in the second isolated calculation area and whose integrity has been authenticated, plaintext target data is obtained by decryption using the data encryption key received through the secure environment.

In the above series of processes, provided that the integrity of the first application running in the first isolated calculation area has been authenticated, the data encryption key used to encrypt the target data is transmitted to the first information processing device through the secure environment between the management unit and the first information processing device. Similarly, provided that the integrity of the second application running in the second isolated calculation area has been authenticated, the data encryption key used to decrypt the target data is transmitted to the second information processing device through the secure environment between the management unit and the second information processing device. In this manner, since the integrity of the applications running in the first and second isolated calculation areas (that is, the integrity of the applications themselves and the integrity of the isolated calculation areas that are running environments of the applications) should be authenticated, it is possible to prevent participants in the process from tampering with the applications.

As the above-described secure environment between the management unit and the first information processing device and secure environment between the management unit and the second information processing device, a secure communication environment may be used, or a mechanism for preventing data tampering (for example, envelope encryption in which a data key used to encrypt and decrypt data is encrypted with an encryption key, or an encryption method using a public key and private key pair) may be used. An example of the latter case will be described in an embodiment of the invention. Since the data encryption key used to encrypt the target data is transmitted and received between the management unit and the first information processing device through the secure environment between the management unit and the first information processing device as described above, it is possible to prevent data tampering by other participants (in this case, the second information processing device). Similarly, since the data encryption key used to decrypt the target data is transmitted and received between the management unit and the second information processing device through the secure environment between the management unit and the second information processing device, it is possible to prevent data tampering by other participants (in this case, the first information processing device).

That is, since both "data tampering" and "application tampering" from participants in the process can be prevented, it is not necessary to perform one-by-one data verification processing unlike in the past. As a result, a system designed to be able to respond to attacks from semi-honest models can be made to respond to attacks from malicious models without causing performance degradation.

Advantageous Effects of Invention

According to the present disclosure, a system designed to be able to respond to attacks from semi-honest models can be made to respond to attacks from malicious models without causing performance degradation.

DESCRIPTION OF EMBODIMENTS

Hereinafter, embodiments of the present disclosure will be described with reference to the diagrams.
(Regarding the Configuration of an Information Processing System)

Figure 1:
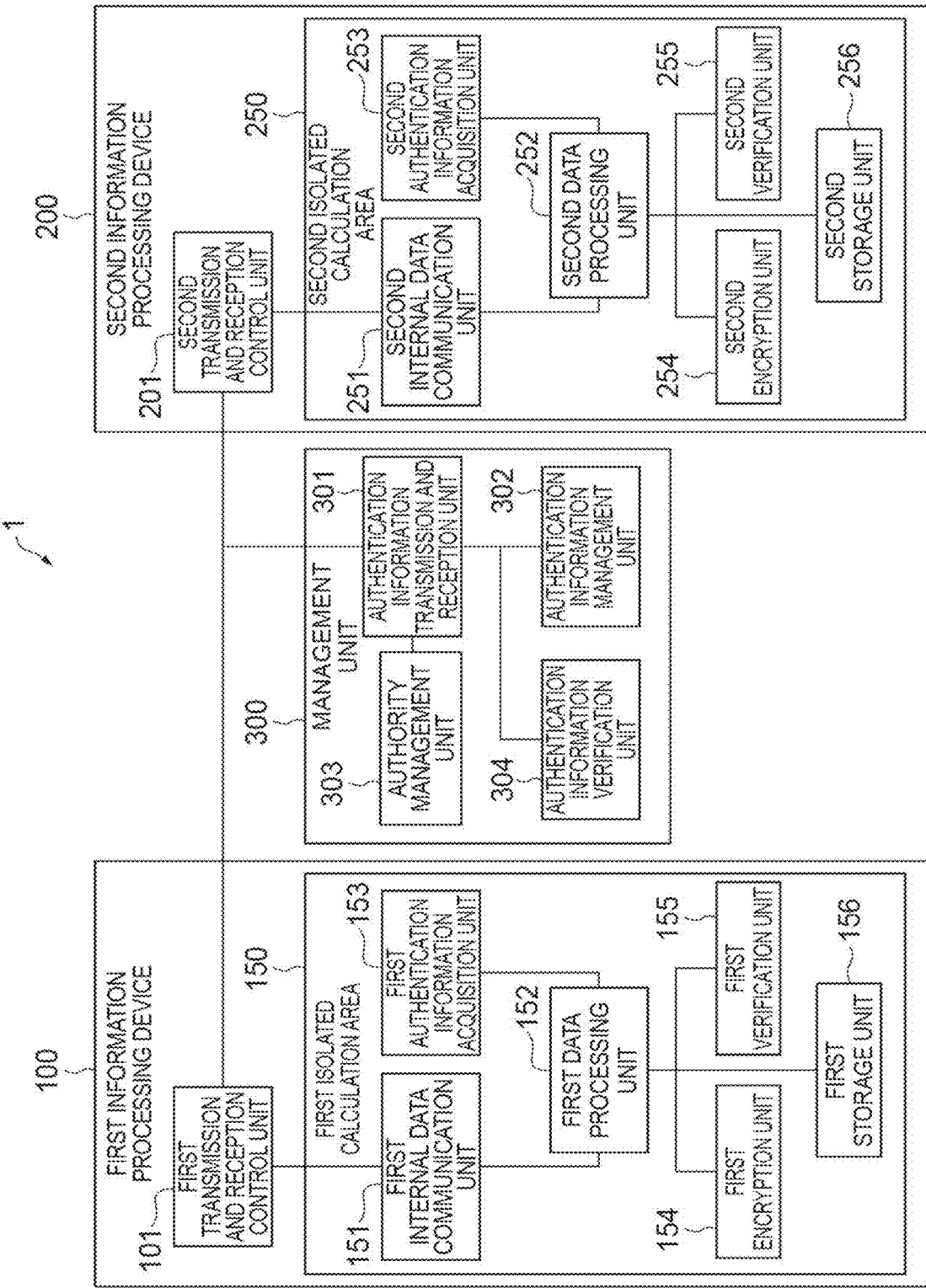
FIG. 1 is a configuration diagram of an information processing system according to an embodiment of the invention.

As shown in FIG. 1, an information processing system 1 according to the present embodiment includes a first information processing device 100 in which a first isolated calculation area 150 is formed as an isolated calculation area and a second information processing device 200 in which a second isolated calculation area 250 is formed as an isolated calculation area, and a management unit 300 that generates and manages an encryption key and an encrypted data key encrypted with the encryption key is provided outside the first information processing device 100 and the second information processing device 200. In addition, the management unit 300 may be provided inside the first information processing device 100 or the second information processing device 200, and such a modification example will be described later. In addition, both the first isolated calculation area 150 and the second isolated calculation area 250 may be formed using physical isolation or may be formed using logical isolation. Among these, as an example of formation using logical isolation, an example of formation using a TEE (Trusted Execution Environment), which is a secure execution environment that allows the use of some of the resources of an information processing device, such as a memory and a CPU, and is logically isolated from the host OS, can be mentioned.

In the first information processing device 100 described above, the reliability of an application (that is, guarantees that the application is implemented correctly) running in the first isolated calculation area 150 has been verified by the secure computing participant who operates the first information processing device 100, and in the second information processing device 200, the reliability of an application running in the second isolated calculation area 250 has been verified by the secure computing participant who operates the second information processing device 200. In addition, examples of the method for verifying the reliability of the application include source code review and verification by an external organization, but verifying the reliability of the application is not limited to specific methods. Processes in FIGS. 2 to 4 described below are performed on the assumption that the reliability of the applications operating in the first and second isolated calculation areas has been verified. On the other hand, the integrity of the applications running in the first and second isolated calculation areas (that is, the integrity of the applications themselves (for example, guarantees that the applications have not been tampered with since a predetermined point in time) and the integrity of the isolated calculation areas that are running environments of the applications) is verified in the processes shown in FIGS. 2 to 4 described below.

In the functional block diagram of FIG. 1, the first isolated calculation area 150 formed in the first information processing device 100 is clearly shown, and various functional units (for example, a first authentication information acquisition unit 153) realized by applications running in the first isolated calculation area 150 are described. The same is true for the second isolated calculation area 250 formed in the second information processing device 200, and various functional units realized by applications running in the management unit 300 are also described. Hereinafter, the function of each functional unit will be outlined.

The first information processing device 100 includes a first transmission and reception control unit 101 realized by an application running outside the first isolated calculation area 150. The first transmission and reception control unit 101 serves as an input and output interface with a secure computing participant who operates the first information processing device 100, and is also a functional unit that performs communication with a functional unit running in the first isolated calculation area 150 and the second information processing device 200 and the management unit 300. The content of the communication herein broadly includes authentication information, data, notifications, and the like.

The first information processing device 100 includes a first internal data communication unit 151, a first data processing unit 152, a first authentication information acquisition unit 153, a first encryption unit 154, a first verification unit 155, and a first storage unit 156 as functional units realized by the application running in the first isolated calculation area 150.

Among these, the first internal data communication unit 151 is a functional unit that performs communication between each functional unit described below in the first isolated calculation area 150 and the first transmission and reception control unit 101, and the first data processing unit 152 is a functional unit that performs any data processing and calls other functional units according to the processing content. The first authentication information acquisition unit 153 is a functional unit that generates first authentication information used by the management unit 300 to verify the integrity of the application running in the first isolated calculation area 150 and also generates a public key pair (first public key and first private key). The above-described first authentication information includes, for example, a hash value of the application calculated using a predetermined hash function. This hash value is calculated at the initial stage using the hash function. By comparing this hash value with the initial hash value stored in the management unit 300, the integrity of the application itself is verified by the management unit 300. In addition, the first authentication information also includes test result data output from a predetermined operational test to verify the integrity of the first isolated calculation area 150 itself (hardware of the operating environment, firmware to boot, and the like). This test result data is also compared with the initial value of test result data calculated at the initial stage and stored in the management unit 300, thereby verifying the integrity of the first isolated calculation area 150 itself by the management unit 300. The first encryption unit 154 is a functional unit that decrypts the encrypted data key from the management unit 300 using the first private key generated by the first authentication information acquisition unit 153 and encrypts and decrypts target data to be processed using the obtained plaintext data key. The first verification unit 155 is a functional unit that verifies whether or not the decrypted target data is correct, and the first storage unit 156 is a functional unit that stores various kinds of data, authentication information, and the like.

As is apparent from FIG. 1, the second information processing device 200 has a functional block configuration similar to that of the first information processing device 100 described above, and includes various functional units obtained by changing the prefix of the name of each functional unit of the first information processing device 100 from "first" to "second". That is, a second internal data communication unit 251 corresponds to the first internal data communication unit 151 and has the same function. Since the same is true for the other functional units, repeated description thereof will be omitted.

The management unit 300 includes an authentication information transmission and reception unit 301, an authentication information management unit 302, an authority management unit 303, and an authentication information verification unit 304 as functional units realized by the application running in the management unit 300. Among these, the authentication information transmission and reception unit 301 is a functional unit that performs communication with each of the first and second information processing devices, and the authentication information management unit 302 is a functional unit that performs generation, management, and deletion of encryption keys and data keys, encryption of data keys using public keys, encryption and decryption of data keys using encryption keys, management of authentication information used when checking the authority to use encryption keys, and the like. The authority management unit 303 is a functional unit that performs authority management for the encryption key of the authentication information management unit 302, and specifically, sets the use authority such as who can use the key. In addition, the authority management unit 303 also manages the operation authority of the authority management function, and specifically, sets the operation authority such as who can operate the use authority. The authentication information verification unit 304 is a functional unit that verifies the integrity of the application by comparing authentication information (for example, a hash value of the application) transmitted from each of the first and second information processing devices with authentication information (for example, an initial value of the hash value of the application) stored in the authority management unit 303. The authentication information transmission and reception unit 301, the authentication information management unit 302, the authority management unit 303, and the authentication information verification unit 304 described above work together to realize the functions of a "first management unit" and a "second management unit" described in the claims.

(Regarding Processes Performed in the Information Processing System)

Figure 2:
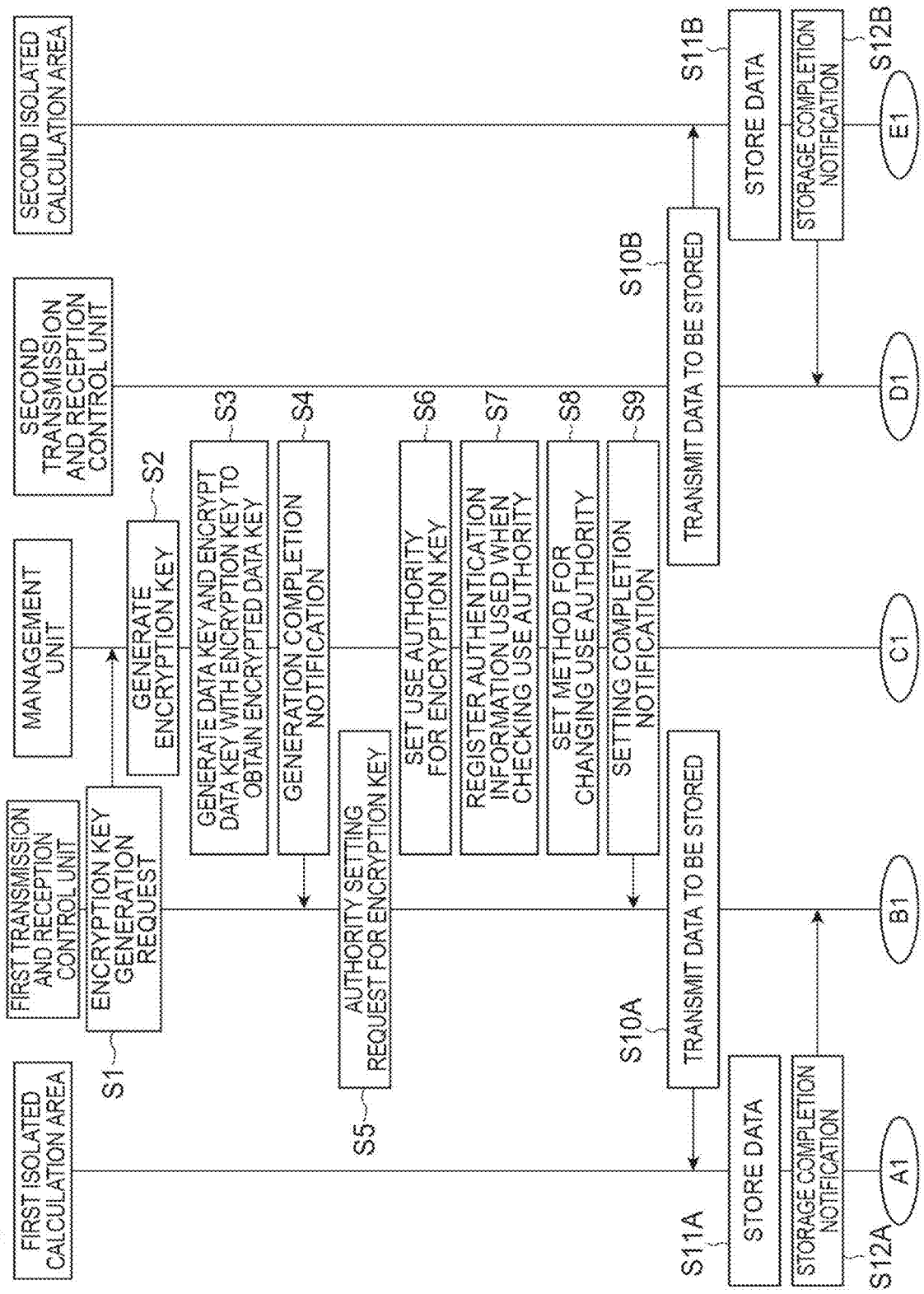
FIG. 2 is a first flowchart showing processing performed in the information processing system according to the embodiment of the invention.
Figure 3:
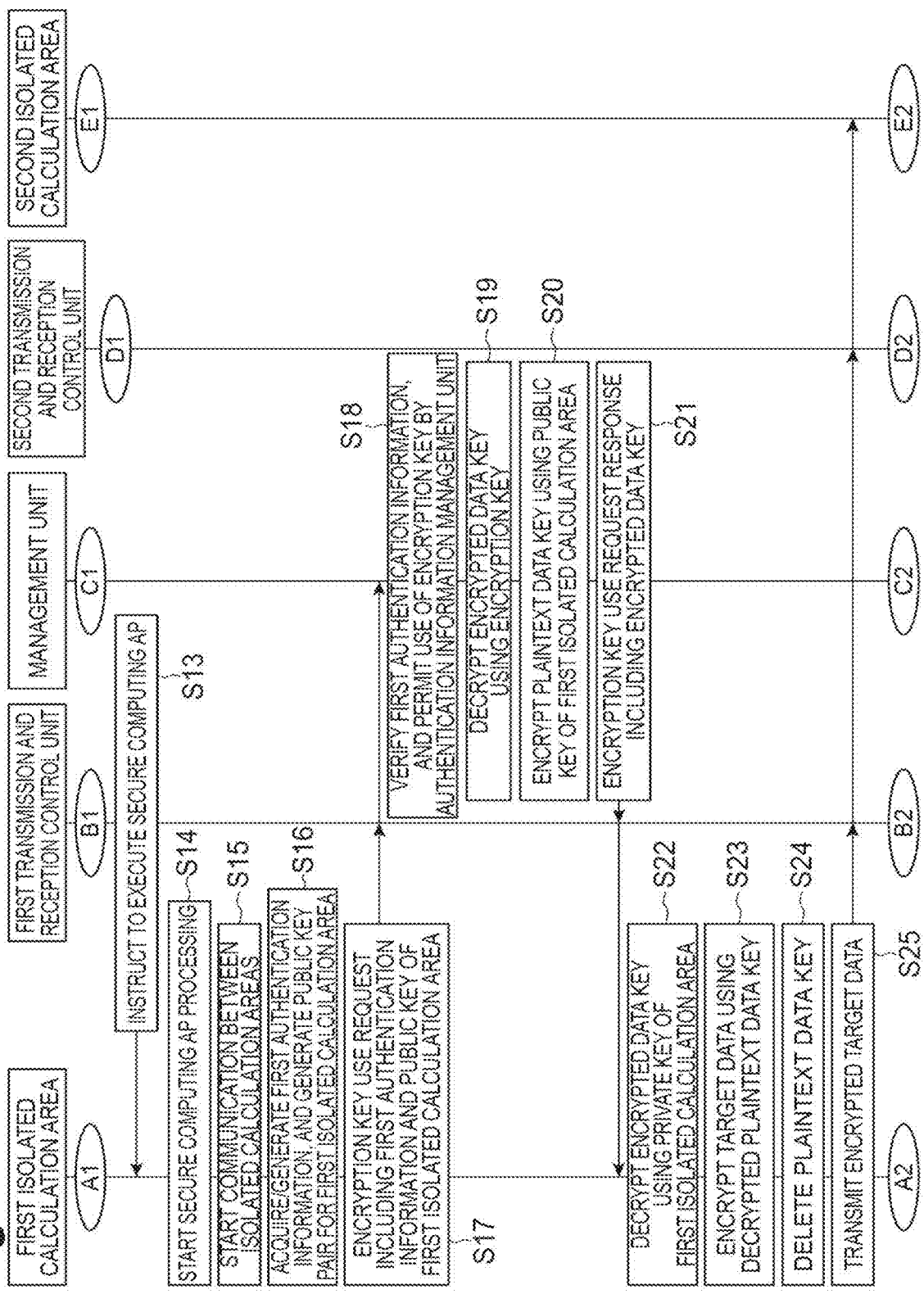
FIG. 3 is a second flowchart showing the processing performed in the information processing system according to the embodiment of the invention.
Figure 4:
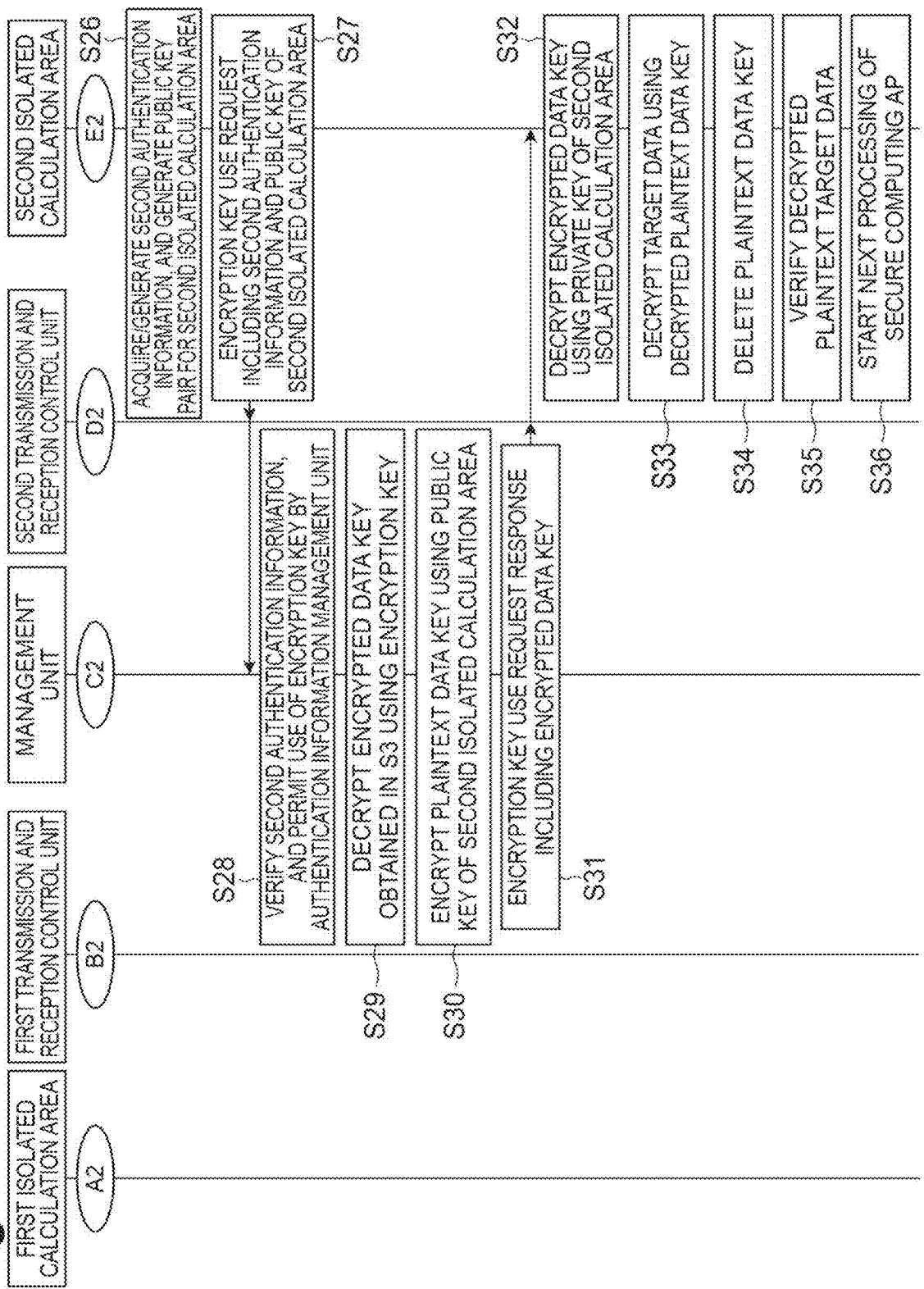
FIG. 4 is a third flowchart showing the processing performed in the information processing system according to the embodiment of the invention.

In the information processing system 1 shown in FIG. 1, the processes shown in FIGS. 2 to 4 are performed. As described above, the processes shown in FIGS. 2 to 4 described below are performed on the assumption that the reliability of the applications running in the first and second isolated calculation areas has been verified. In addition, in FIGS. 2 to 4, the processing of functional units operating in the first isolated calculation area 150 is described in the vertical column of the "first isolated calculation area", and the processing of functional units operating in the second isolated calculation area 250 is described in the vertical column of the "second isolated calculation area". Symbol A1 in FIG. 2 means that the processing continues to the same symbol A1 in the next diagram (FIG. 3). The same is true for the other symbols A2, B1, B2, . . . , E2.

First, in response to an instruction from the secure computing participant who operates the first information processing device 100, the first transmission and reception control unit 101 of the first information processing device 100 transmits an encryption key generation request to the management unit 300 (step S1 in FIG. 2). In addition, the encryption key generation request may be transmitted to the management unit 300 not from the first information processing device 100 but from the secure computing participant who operates the first information processing device 100. In the management unit 300, the authentication information transmission and reception unit 301 receives the encryption key generation request, and the authentication information management unit 302 generates an encryption key in response to the request (step S2), and generates a data key and encrypts the data key with the encryption key to obtain an encrypted data key (step S3). Thereafter, the authentication information transmission and reception unit 301 transmits a generation completion notification to the first transmission and reception control unit 101 (step S4). As a result of the above, the encryption key and the encrypted data key are generated in the management unit 300, and are stored by the authentication information management unit 302.

Then, in response to an instruction from the secure computing participant who operates the first information processing device 100, the first transmission and reception control unit 101 transmits an authority setting request for the encryption key to the management unit 300 (step S5). In addition, the authority setting request may be transmitted to the management unit 300 not from the first information processing device 100 but from the secure computing participant who operates the first information processing device 100. In the management unit 300, the authentication information transmission and reception unit 301 receives the authority setting request, the authority management unit 303 sets the use authority for the encryption key in response to the request (step S6), and the authentication information management unit 302 registers authentication information used when checking the use authority (step S7). Here, for example, for an application running in the first isolated calculation area 150, first authentication information is registered, which includes an initial value of the hash value of the application calculated using a predetermined hash function and an initial value of test result data output from a predetermined operational test to verify the integrity of the first isolated calculation area 150 itself, and for an application running in the second isolated calculation area 250, second authentication information is registered, which includes an initial value of the hash value of the application calculated using a predetermined hash function and an initial value of test result data output from a predetermined operational test to verify the integrity of the second isolated calculation area 250 itself. In addition, the authority management unit 303 also sets a method for changing the use authority (step S8). The method for changing the use authority herein may be, for example, making the use authority unchangeable by any secure computing participant or changing the use authority with the agreement of both secure computing participants. Thereafter, the authentication information transmission and reception unit 301 transmits a setting completion notification to the first transmission and reception control unit 101 (step S9). As a result of the above, in the management unit 300, the use authority for the encryption key and the method for changing the use authority are set, and the authentication information used when checking the use authority is registered.

Then, data to be stored (data to be processed or referenced later by a secure computing application) is input and stored as follows. The first transmission and reception control unit 101 transmits data to be stored in the first information processing device 100 to the first internal data communication unit 151 operating in the first isolated calculation area 150 (step S10A). The data received by the first internal data communication unit 151 is transmitted to the first data processing unit 152 and stored in the first storage unit 156 called by the first data processing unit 152 (step S11A). When the storage is completed, the first data processing unit 152 causes the called first internal data communication unit 151 to transmit a storage completion notification to the first transmission and reception control unit 101 (step S12A). Similarly, data to be stored in the second information processing device 200 is stored in a second storage unit 256 by the processing of steps S10B to S12B in FIG. 2. As described above, data to be stored (data to be processed or referenced later by a secure computing application) is input and stored in each of the first and second information processing devices.

Then, in response to an instruction from the secure computing participant who operates the first information processing device 100, the first transmission and reception control unit 101 transmits an instruction to execute the secure computing application to the first internal data communication unit 151 operating in the first isolated calculation area 150 (step S13 in FIG. 3), and the first data processing unit 152 that receives the instruction from the first internal data communication unit 151 starts secure computing application processing (step S14), starts communication between the isolated calculation areas (step S15), and calls the first authentication information acquisition unit 153. For the application running in the first isolated calculation area 150, the first authentication information acquisition unit 153 calculates a hash value of the application using a predetermined hash function, obtains test result data output from an operational test for verifying the integrity of the first isolated calculation area 150 itself, generates or acquires first authentication information including the hash value and the test result data, and generates a public key pair for the first isolated calculation area (step S16). Then, the first data processing unit 152 calls the first internal data communication unit 151, and causes the first internal data communication unit 151 to transmit an encryption key use request including the first authentication information and the public key of the first isolated calculation area to the management unit 300 through the first transmission and reception control unit 101 (step S17).

In the management unit 300, the authentication information transmission and reception unit 301 receives the encryption key use request including the first authentication information and the public key of the first isolated calculation area, and then the authentication information verification unit 304 verifies the first authentication information by checking whether or not the hash value and the test result data included in the received first authentication information match the initial value of the hash value and the initial value of the test result data registered in step S7 of FIG. 2, respectively. Here, when the application running in the first isolated calculation area 150 has not been tampered with and the first isolated calculation area 150 as a running environment has not been modified either, the hash value and the test result data included in the first authentication information match their respective initial values and the integrity of the application (that is, the integrity of the application itself and the integrity of the isolated calculation area itself) is verified (authentication is successful), and the authentication information verification unit 304 permits the use of the encryption key by the authentication information management unit 302 (step S18).

Upon receiving the above permission, the authentication information management unit 302 decrypts the encrypted data key obtained in the above step S3 using the encryption key (step S19) to obtain a plaintext data key, and encrypts the plaintext data key using the public key of the first isolated calculation area (step S20) to obtain an encrypted data key. In addition, the authentication information management unit 302 causes the authentication information transmission and reception unit 301 to transmit an encryption key use request response including the encrypted data key to the first data processing unit 152, which is a source of the request, through the first transmission and reception control unit 101 (step S21).

The first data processing unit 152 that has received the encryption key use request response including the encrypted data key through the first internal data communication unit 151 calls the first encryption unit 154, and causes the first encryption unit 154 to decrypt the encrypted data key using the private key of the first isolated calculation area that is paired with the public key of the first isolated calculation area (step S22). In addition, the first encryption unit 154 encrypts target data (corresponding to a part or entirety of the above-described data to be stored) using the decrypted plaintext data key (step S23), and then deletes the plaintext data key (step S24). Then, the first data processing unit 152 calls the first internal data communication unit 151, and causes the first internal data communication unit 151 to transmit the encrypted target data obtained in step S23 to the second internal data communication unit 251 operating in the second isolated calculation area 250 through the first transmission and reception control unit 101 and the second transmission and reception control unit 201 (step S25).

A second data processing unit 252, to which the encrypted target data has been transmitted from the second internal data communication unit 251, calls the second authentication information acquisition unit 253. For the application running in the second isolated calculation area 250, the second authentication information acquisition unit 253 calculates a hash value of the application using a predetermined hash function, obtains test result data output from an operational test for verifying the integrity of the second isolated calculation area 250 itself, generates or acquires second authentication information including the hash value and the test result data, and generates a public key pair for the second isolated calculation area (step S26 in FIG. 4). Then, the second data processing unit 252 calls the second internal data communication unit 251, and causes the second internal data communication unit 251 to transmit an encryption key use request including the second authentication information and the public key of the second isolated calculation area to the management unit 300 through the second transmission and reception control unit 201 (step S27).

In the management unit 300, the authentication information transmission and reception unit 301 receives the encryption key use request including the second authentication information and the public key of the second isolated calculation area, and then the authentication information verification unit 304 verifies the second authentication information by checking whether or not the hash value and the test result data included in the received second authentication information match the initial value of the hash value and the initial value of the test result data registered in step S7 of FIG. 2, respectively. Here, when the application running in the second isolated calculation area 250 has not been tampered with and the second isolated calculation area 250 as a running environment has not been modified either, the hash value and the test result data included in the second authentication information match their respective initial values and the integrity of the application (that is, the integrity of the application itself and the integrity of the isolated calculation area itself) is verified (authentication is successful), and the authentication information verification unit 304 permits the use of the encryption key by the authentication information management unit 302 (step S28).

Upon receiving the above permission, the authentication information management unit 302 decrypts the encrypted data key obtained in the above step S3 using the encryption key (step S29) to obtain a plaintext data key, and encrypts the plaintext data key using the public key of the second isolated calculation area (step S30) to obtain an encrypted data key. In addition, the authentication information management unit 302 causes the authentication information transmission and reception unit 301 to transmit an encryption key use request response including the encrypted data key to the second data processing unit 252, which is a source of the request, through the second transmission and reception control unit 201 (step S31).

The second data processing unit 252 that has received the encryption key use request response including the encrypted data key through the second internal data communication unit 251 calls the second encryption unit 254, and causes the second encryption unit 254 to decrypt the encrypted data key using the private key of the second isolated calculation area that is paired with the public key of the second isolated calculation area (step S32). In addition, the second encryption unit 254 decrypts the encrypted target data transmitted in step S25 using the decrypted plaintext data key (step S33), and then deletes the plaintext data key (step S34). Then, the second data processing unit 252 transmits the plaintext target data decrypted in step S33 to a second verification unit 255, and the second verification unit 255 verifies the decrypted plaintext target data (step S35). If there is no problem as a result of the verification, the plaintext target data (that is, the target data from the first information processing device 100) is to be processed by the secure computing application together with the target data stored in the second information processing device 200. Thereafter, the next processing of the secure computing application is started (step S36), and the process returns to step S15 to repeat the same processes.

In addition, the generation of the public key pair in the above steps S16 and S26 does not need to be performed for each processing loop of steps S15 to S36 and may be performed only the first time.

According to the embodiment described above, provided that the integrity of the application running in the first isolated calculation area 150 has been authenticated and the integrity of the application running in the second isolated calculation area 250 has been authenticated, the "encryption key" required to decrypt the data key used to encrypt and decrypt the target data is used to decrypt the data key, and the obtained plaintext data key is used to encrypt and decrypt the target data. In this manner, since the integrity of the applications running in the first and second isolated calculation areas (that is, the integrity of the applications themselves and the integrity of the isolated calculation areas that are running environments of the applications) should be authenticated, it is possible to prevent secure computing participants from tampering with the applications.

In addition, the "data key" used to encrypt the target data is transmitted from the management unit 300 to the first information processing device 100 in an encrypted secure format using the pair of the first public key and the first private key generated by the application running in the first isolated calculation area 150, and is decrypted in the first isolated calculation area 150 using the first private key that can only be used in the first isolated calculation area 150. In this manner, since the data encryption key used to encrypt the target data is transmitted and received between the management unit 300 and the first information processing device 100 through the secure environment between the management unit 300 and the first information processing device 100, it is possible to prevent data tampering by other participants (in this case, the second information processing device 200). Similarly, the "data key" used to decrypt the target data is transmitted from the management unit 300 to the second information processing device 200 in an encrypted secure format using the pair of the second public key and the second private key generated by the application running in the second isolated calculation area 250, and is decrypted in the second isolated calculation area 250 using the second private key that can only be used in the second isolated calculation area 250. In this manner, since the data encryption key used to decrypt the target data is transmitted and received between the management unit 300 and the second information processing device 200 through the secure environment between the management unit 300 and the second information processing device 200, it is possible to prevent data tampering by other participants (in this case, the first information processing device 100). In addition, as a secure environment between the management unit 300 and each information processing device, it is not mandatory to use a mechanism for preventing the data tampering described above (for example, envelope encryption in which a data key used to encrypt and decrypt data is encrypted with an encryption key, or an encryption method using a public key and private key pair), and a secure communication environment between the management unit 300 and each information processing device may be used.

Thus, since both "data tampering" and "application tampering" from secure computing participants can be prevented, it is not necessary to perform one-by-one data verification processing unlike in the past. As a result, a system designed to be able to respond to attacks from semi-honest models can be made to respond to attacks from malicious models without causing performance degradation.

In addition, both the first isolated calculation area 150 and the second isolated calculation area 250 may be formed using physical isolation or may be formed using logical isolation. Among these, as an example of formation using logical isolation, an example of formation using the TEE described above can be mentioned. Since the TEE is an existing technology, the above-described isolated calculation area can be formed relatively easily while suppressing development costs by effectively utilizing the existing technology.

(Modification Examples of the Information Processing System)

Figure 5:
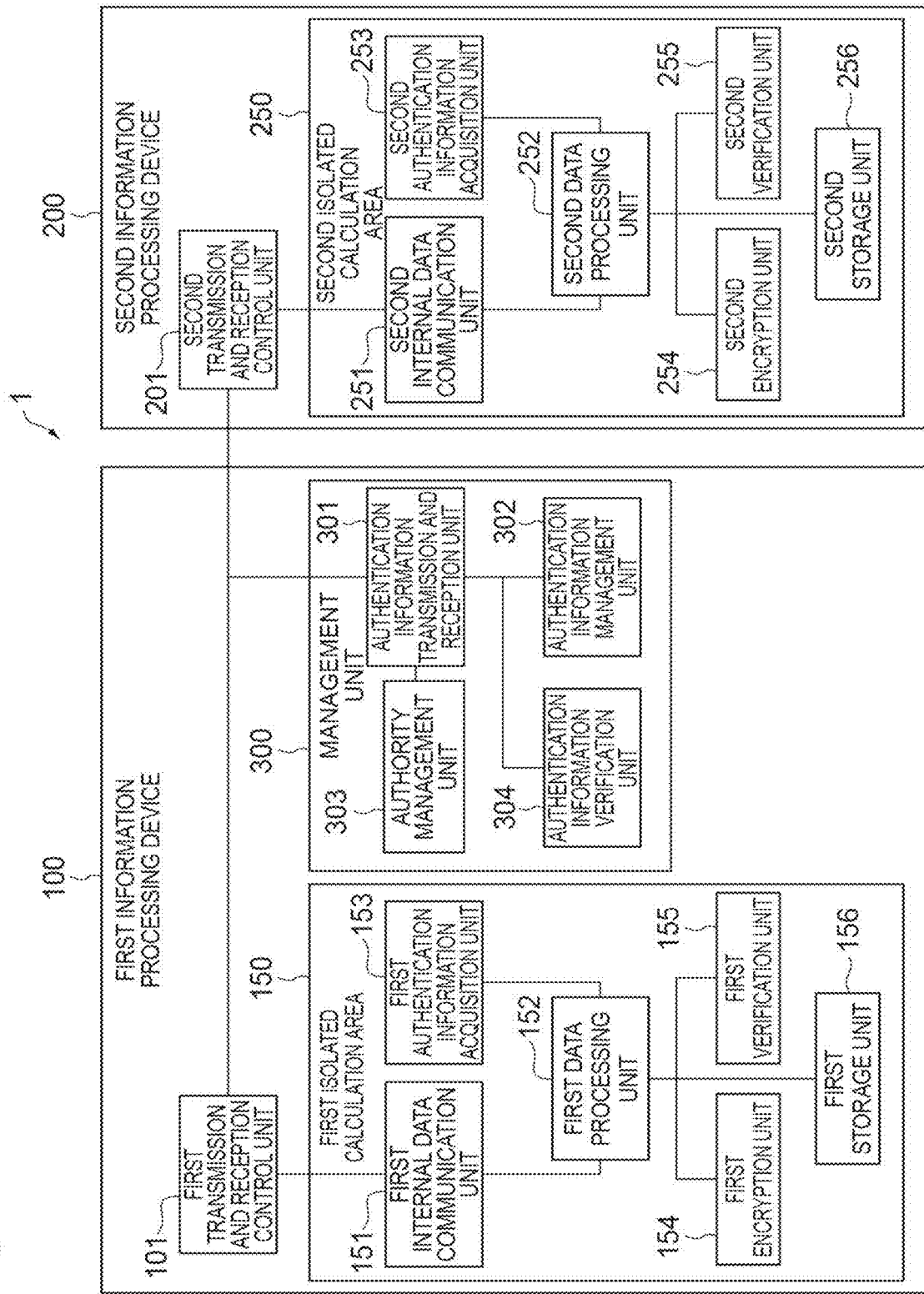
FIG. 5 is a configuration diagram showing a first modification example of the information processing system.
Figure 6:
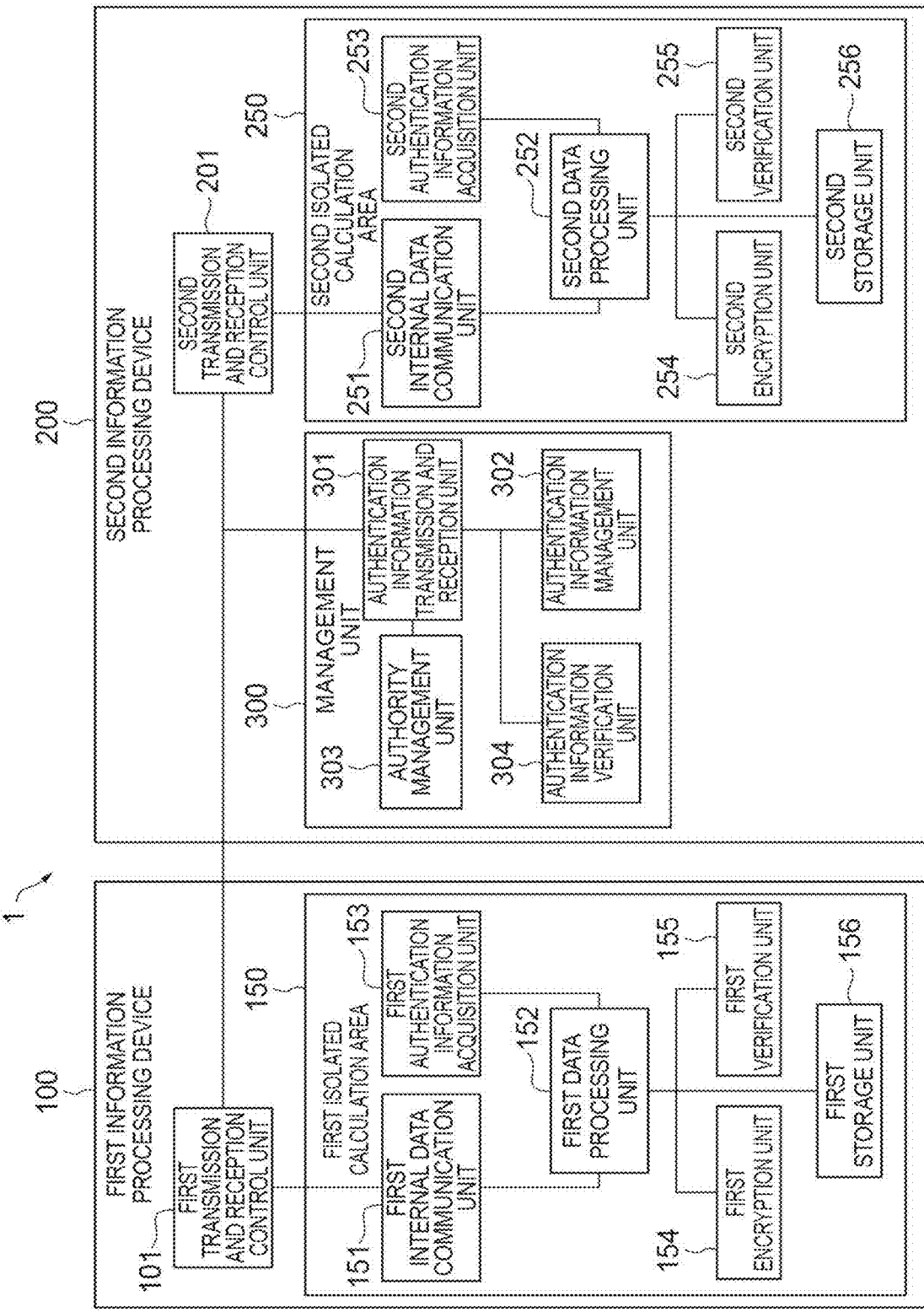
FIG. 6 is a configuration diagram showing a second modification example of the information processing system.

In the above embodiment, as shown in FIG. 1, a configuration example has been described in which the management unit 300 is provided outside the first information processing device 100 and the second information processing device 200. However, it is possible to adopt a configuration in which the management unit 300 is provided inside any of the information processing devices based on the agreement between secure computing participants on the first information processing device 100 side and secure computing participants on the second information processing device 200 side. For example, as shown in FIG. 5, a configuration (first modification example) in which the management unit 300 is provided inside the first information processing device 100 may be adopted, or as shown in FIG. 6, a configuration (second modification example) in which the management unit 300 is provided inside the second information processing device 200 may be adopted, and effects similar to those of the above embodiment can be obtained.

(Description of Terms and Hardware Configuration (FIG. 7) and the Like)

In addition, the block diagrams used in the description of the above embodiment and modification examples show blocks in functional units. These functional blocks (configuration units) are realized by any combination of at least one of hardware and software. In addition, a method of realizing each functional block is not particularly limited. That is, each functional block may be realized using one physically or logically coupled device, or may be realized by connecting two or more physically or logically separated devices directly or indirectly (for example, using a wired or wireless connection) and using the plurality of devices. Each functional block may be realized by combining the above-described one device or the above-described plurality of devices with software.

Functions include determining, judging, computing, calculating, processing, deriving, investigating, searching, ascertaining, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, and the like, but are not limited thereto. For example, a functional block (configuration unit) that makes the transmission work is called a transmitting unit or a transmitter. In any case, as described above, the implementation method is not particularly limited.

Figure 7:
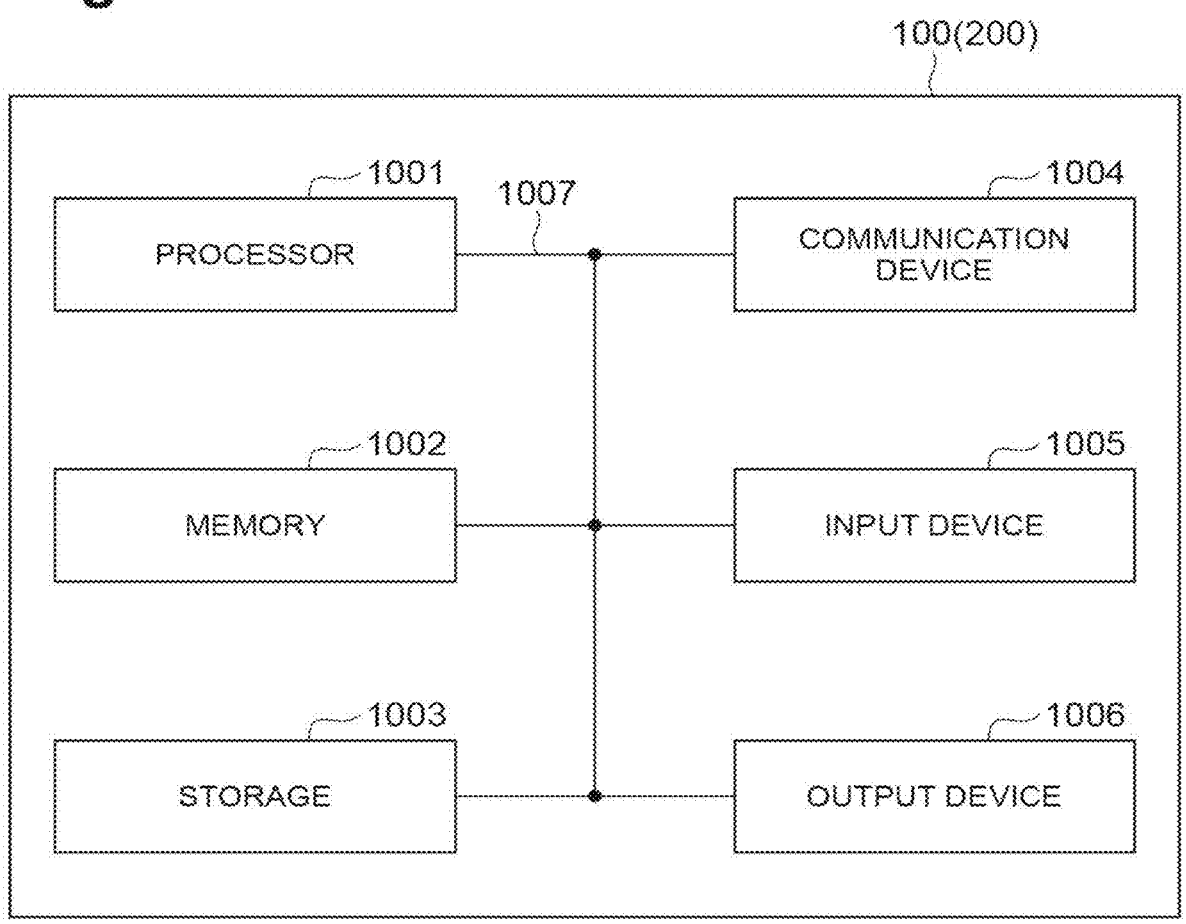
FIG. 7 is a diagram illustrating an example of the hardware configuration of an information processing device.

For example, the information processing device according to an embodiment of the present disclosure may function as a computer that performs the processing according to the present embodiment. FIG. 7 is a diagram illustrating an example of the hardware configuration of the first information processing device 100 according to an embodiment of the present disclosure. The first information processing device 100 described above may be physically configured as a computer device including a processor 1001, a memory 1002, a storage 1003, a communication device 1004, an input device 1005, an output device 1006, a bus 1007, and the like. In addition, the second information processing device 200 may be configured similarly to the first information processing device 100.

In the following description, the term "device" can be read as a circuit, a unit, and the like. The hardware configuration of the first information processing device 100 may include one or more devices for each device shown in the diagram, or may not include some devices.

Each function of the first information processing device 100 is realized by reading predetermined software (program) onto hardware, such as the processor 1001 and the memory 1002, so that the processor 1001 performs an operation and controlling communication by the communication device 1004 or controlling at least one of reading and writing of data in the memory 1002 and the storage 1003.

The processor 1001 controls the entire computer by operating an operating system, for example. The processor 1001 may be a central processing unit (CPU) including an interface with peripheral devices, a control device, a calculation device, a register, and the like.

In addition, the processor 1001 reads a program (program code), a software module, data, and the like into the memory 1002 from at least one of the storage 1003 and the communication device 1004, and performs various kinds of processing according to these. As the program, a program causing a computer to execute at least a part of the operation described in the above embodiment is used. Although it has been described that the various kinds of processes described above are performed by one processor 1001, the various kinds of processes described above may be performed simultaneously or sequentially by two or more processors 1001. The processor 1001 may be implemented by one or more chips. In addition, the program may be transmitted from a network through a telecommunication line.

The memory 1002 is a computer-readable recording medium, and may be at least one of, for example, a ROM (Read Only Memory), an EPROM (Erasable Programmable ROM), an EEPROM (Electrically Erasable Programmable ROM), and a RAM (Random Access Memory). The memory 1002 may be called a register, a cache, a main memory (main storage device), and the like. The memory 1002 can store a program (program code), a software module, and the like that can be executed to implement the wireless communication method according to an embodiment of the present disclosure.

The storage 1003 is a computer-readable recording medium, and may be at least one of, for example, an optical disk such as a CD-ROM (Compact Disc ROM), a hard disk drive, a flexible disk, and a magneto-optical disk (for example, a compact disk, a digital versatile disk, and a Blu-ray (Registered trademark) disk), a smart card, a flash memory (for example, a card, a stick, a key drive), a floppy (registered trademark) disk, and a magnetic strip. The storage 1003 may be called an auxiliary storage device. The storage medium described above may be, for example, a database including at least one of the memory 1002 and the storage 1003, a server, or other appropriate media.

The communication device 1004 is hardware (transmitting and receiving device) for performing communication between computers through at least one of a wired network and a wireless network, and is also referred to as, for example, a network device, a network controller, a network card, and a communication module.

The input device 1005 is an input device (for example, a keyboard, a mouse, a microphone, a switch, a button, and a sensor) for receiving an input from the outside. The output device 1006 is an output device (for example, a display, a speaker, and an LED lamp) that performs output to the outside. In addition, the input device 1005 and the output device 1006 may be integrated (for example, a touch panel). In addition, respective devices, such as the processor 1001 and the memory 1002, are connected to each other by the bus 1007 for communicating information. The bus 1007 may be configured using a single bus, or may be configured using a different bus for each device.

Each aspect/embodiment described in the present disclosure may be used alone, may be used in combination, or may be switched and used according to execution. In addition, the notification of predetermined information (for example, notification of "X") is not limited to being explicitly performed, and may be performed implicitly (for example, without the notification of the predetermined information).

While the present disclosure has been described in detail, it is apparent to those skilled in the art that the present disclosure is not limited to the embodiment described in the present disclosure. The present disclosure can be implemented as modified and changed aspects without departing from the spirit and scope of the present disclosure defined by the description of the claims. Therefore, the description of the present disclosure is intended for illustrative purposes, and has no restrictive meaning to the present disclosure.

In the processing procedure, sequence, flowchart, and the like in each aspect/embodiment described in the present disclosure, the order may be changed as long as there is no contradiction. For example, for the methods described in the present disclosure, elements of various steps are presented using an exemplary order. However, the present invention is not limited to the specific order presented.

Information and the like that are input and output may be stored in a specific place (for example, a memory) or may be managed using a management table. The information and the like that are input and output can be overwritten, updated, or added. The information and the like that are output may be deleted. The information and the like that are input may be transmitted to another device.

The description "based on" used in the present disclosure does not mean "based only on" unless otherwise specified.

In other words, the description "based on" means both "based only on" and "based at least on".

When "include", "including", and variations thereof are used in the present disclosure, these terms are intended to be inclusive similarly to the term "comprising". In addition, the term "or" used in the present disclosure is intended not to be an exclusive-OR.

In the present disclosure, when articles, for example, a, an, and the in English, are added by translation, the present disclosure may include that nouns subsequent to these articles are plural.

In the present disclosure, the expression "A and B are different" may mean "A and B are different from each other". In addition, the expression may mean that "A and B each are different from C". Terms such as "separate" and "coupled" may be interpreted similarly to "different".

REFERENCE SIGNS LIST

1: information processing system, 100: first information processing device, 101: first transmission and reception control unit, 150: first isolated calculation area, 151: first internal data communication unit, 152: first data processing unit, 153: first authentication information acquisition unit, 154: first encryption unit, 155: first verification unit, 156: first storage unit, 200: second information processing device, 201: second transmission and reception control unit, 250: second isolated calculation area, 251: second internal data communication unit, 252: second data processing unit, 253: second authentication information acquisition unit, 254: second encryption unit, 255: second verification unit, 256: second storage unit, 300: management unit, 301: authentication information transmission and reception unit, 302: authentication information management unit, 303: authority management unit, 304: authentication information verification unit, 1001: processor, 1002: memory, 1003: storage, 1004: communication device, 1005: input device, 1006: output device, 1007: bus.

The invention claimed is:

1. An information processing system, comprising:
a management device;
a first information processing device that includes an isolated calculation area in which a first application is running; and
a second information processing device that includes an isolated calculation area in which a second application is running,
wherein the management device includes processing circuitry configured to:
perform communication with each of the first application and the second application; and
generate and store a data key for encrypting target data transmitted and received between the first application and the second application,
wherein when the processing circuitry receives a data encryption key use request from the first application or the second application,
the processing circuitry encrypts the data key by using a public key included in the data encryption key use request, to generate an encrypted data key, and
the processing circuitry sends the encrypted data key to either application sending the data encryption key use request,
wherein each of the first application and the second application is configured to:
send the data encryption key use request to the management device when an encrypted target data is received from the other application; and
decrypt the encrypted data key received from the management device to obtain a decrypted data key, and decrypts the encrypted target data by using the decrypted data key.

2. An information processing device, comprising:
processing circuitry configured to
communicate with each of a first application running in an isolated calculation area formed in a first information processing device and a second application running in an isolated calculation area formed in a second information processing device; and
generate and store a data key for encrypting target data transmitted and received between the first application and the second application,
wherein when a first data encryption key use request is received from the first application, the processing circuitry encrypts the data key by using a public key included in the first data encryption key use request, to generate a first encrypted data key, and the processing circuitry sends the first encrypted data key to the first application, and
wherein when a second data encryption key use request is received from the second application after the first application sends the second application an encrypted target data which the first application encrypted the target data by using the data key, the processing circuitry encrypts the data key by using a public key included in the second data encryption key use request, to generate a second encrypted data key, and the processing circuitry sends the second encrypted data key to the second application.

* * * * *